(12) United States Patent
Katch et al.

(10) Patent No.: US 8,452,493 B2
(45) Date of Patent: May 28, 2013

(54) METHODS AND SYSTEMS INVOLVING RETURN TORQUE

(75) Inventors: Gregory J. Katch, Fenton, MI (US); Abdellatif Boudia, Eaubonne (FR); Eduardo Audino Novo, Lamorlaye (FR)

(73) Assignee: Steering Solutions IP Holding Corporation, Saginaw, MI (US)

( * ) Notice: Subject to any disclaimer, the term of this patent is extended or adjusted under 35 U.S.C. 154(b) by 264 days.

(21) Appl. No.: 12/811,276

(22) PCT Filed: Jan. 23, 2009

(86) PCT No.: PCT/US2009/031799
§ 371 (c)(1),
(2), (4) Date: Jun. 30, 2010

(87) PCT Pub. No.: WO2009/094517
PCT Pub. Date: Jul. 30, 2009

(65) Prior Publication Data
US 2010/0286869 A1    Nov. 11, 2010

Related U.S. Application Data

(60) Provisional application No. 61/023,598, filed on Jan. 25, 2008.

(51) Int. Cl.
*B62D 6/00* (2006.01)
(52) U.S. Cl.
USPC .............................................. 701/41; 701/42

(58) Field of Classification Search
USPC ................................................ 701/36, 41, 42
See application file for complete search history.

(56) References Cited

U.S. PATENT DOCUMENTS

| | | | | |
|---|---|---|---|---|
| 5,541,841 A | * | 7/1996 | Tanaka | 701/41 |
| 6,039,144 A | * | 3/2000 | Chandy et al. | 180/446 |
| 6,968,920 B2 | * | 11/2005 | Barton et al. | 180/446 |
| 7,136,732 B2 | * | 11/2006 | Shimizu et al. | 701/41 |
| 2003/0074120 A1 | * | 4/2003 | Kleinau | 701/41 |
| 2003/0200018 A1 | * | 10/2003 | Arimura | 701/41 |
| 2007/0062755 A1 | * | 3/2007 | Krieger et al. | 180/446 |
| 2007/0168093 A1 | * | 7/2007 | Nishiyama | 701/41 |
| 2007/0233344 A1 | * | 10/2007 | Satake | 701/41 |
| 2007/0294008 A1 | * | 12/2007 | Yasui et al. | 701/41 |
| 2009/0234539 A1 | * | 9/2009 | Champagne et al. | 701/41 |
| 2009/0292421 A1 | * | 11/2009 | Williams et al. | 701/42 |

OTHER PUBLICATIONS

International Search Report for PCT/US09/31799 dated Mar. 13, 2009.
Written Opinion of The International Searching Authority for PCT/US09/31799 dated Mar. 13, 2009.

\* cited by examiner

*Primary Examiner* — Patrick Cicchino
(74) *Attorney, Agent, or Firm* — Cantor Colburn LLP

(57) ABSTRACT

A method of controlling a motor of a power steering system is provided. The method includes: estimating a scale factor based on a vehicle speed and a hand wheel torque; applying the scale factor to a return command; and generating a motor command signal based on the applying the scale factor.

20 Claims, 5 Drawing Sheets

METHODS AND SYSTEMS INVOLVING RETURN TORQUE

CROSS-REFERENCE TO RELATED APPLICATIONS

This application claims the benefit of International Application Serial No. PCT/US09/31799 which claims the benefit of U.S. Provisional Application No. 61/023,598 filed Jan. 25, 2008. The disclosure of each of the above applications is incorporated herein by reference in its entirety.

FIELD

The present invention relates to return force in power steering systems.

BACKGROUND

Power steering systems may use motors or other devices to assist a driver in turning the wheels of a vehicle. When the wheels are in a center position, they are pointing forward such that the vehicle will travel in a straight line. The center position may be referenced as a zero position of a steering wheel or hand wheel of the system.

A return assist force may be used to assist the driver in returning the wheels to the center position. The return force may, for example, be a function of vehicle speed and the hand wheel position. In some systems, the use of a return force may result in an undesirable tactile feel for the driver if the driver imparts a torque on the hand wheel in the same direction as that of the return force. An improved system and method that offers better tactile feel for a driver when a return force is used is desired.

SUMMARY OF THE INVENTION

Accordingly, a method of controlling a motor of a power steering system is provided. The method includes: estimating a scale factor based on a vehicle speed and a hand wheel torque; applying the scale factor to a return command; and generating a motor command signal based on the applying the scale factor.

The above features and advantages and other features and advantages of the present invention are readily apparent from the following detailed description of the embodiments for carrying out the invention when taken in connection with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention will become apparent from the following detailed description taken in conjunction with the drawings.

DETAILED DESCRIPTION

Figure 1:
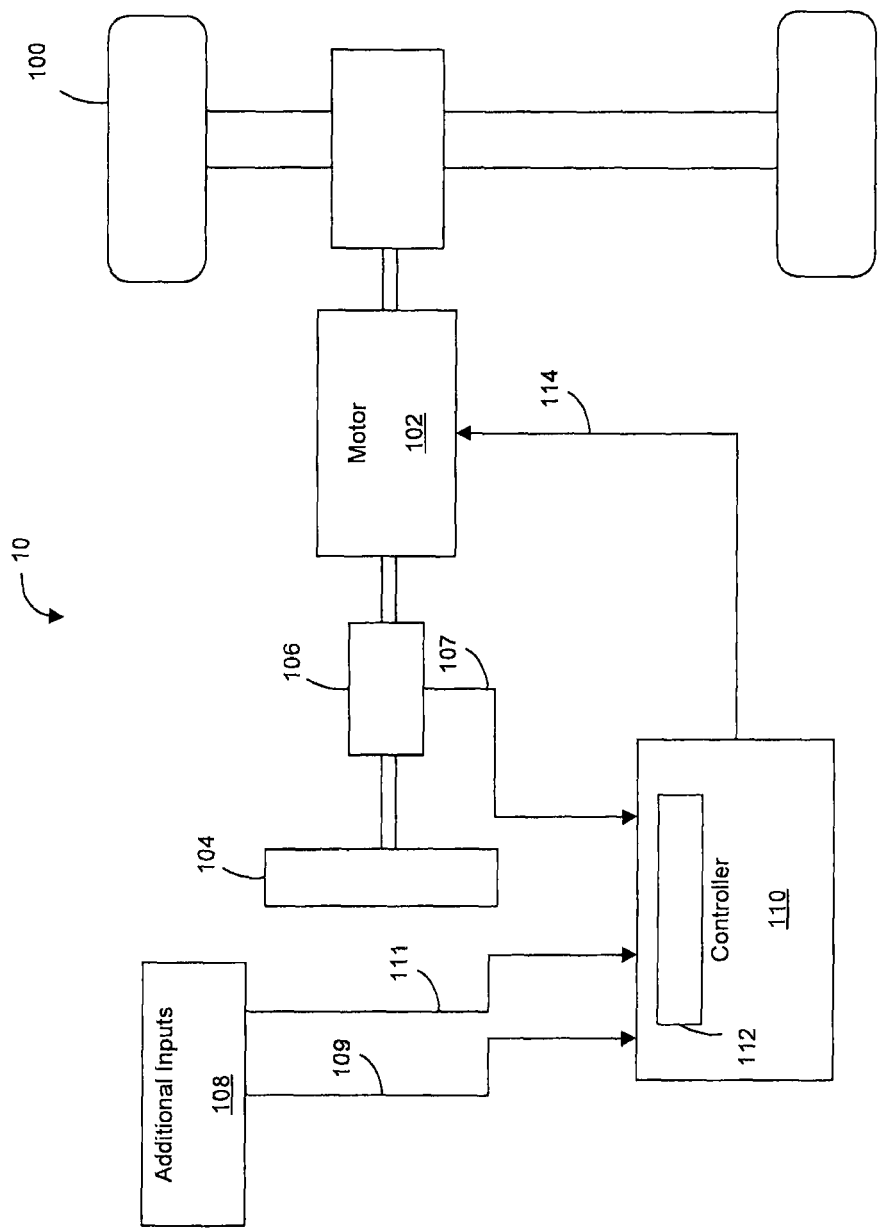
FIG. 1 illustrates block diagram of an exemplary steering control system.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle including a power steering system 10 is illustrated. The power steering system 10 includes, for example, wheels 100, a motor 102, and a hand wheel 104. The wheels 100 are mechanically linked to the motor 102. The hand wheel 104 is mechanically linked to the motor 102.

A torque sensor 106 generates a torque signal 107 based on a torque of the hand wheel 104. Additional inputs 108 such as, for example, vehicle speed sensors and hand wheel angle sensors sense conditions of the power steering system 10 and/or vehicle and generate signals 109, 111 accordingly. The torque sensor 106 and the additional inputs 108 are communicatively linked to a controller 110. The controller 110 includes, for example, a processor 112. Based on the torque sensor signal 107 and the additional signals 109, 111, the controller 110 determines a motor command signal 114. The controller 110 generates the motor command signal 114 and sends the motor command signal 114 to the motor 102 to control the steering system 10.

Figure 2:
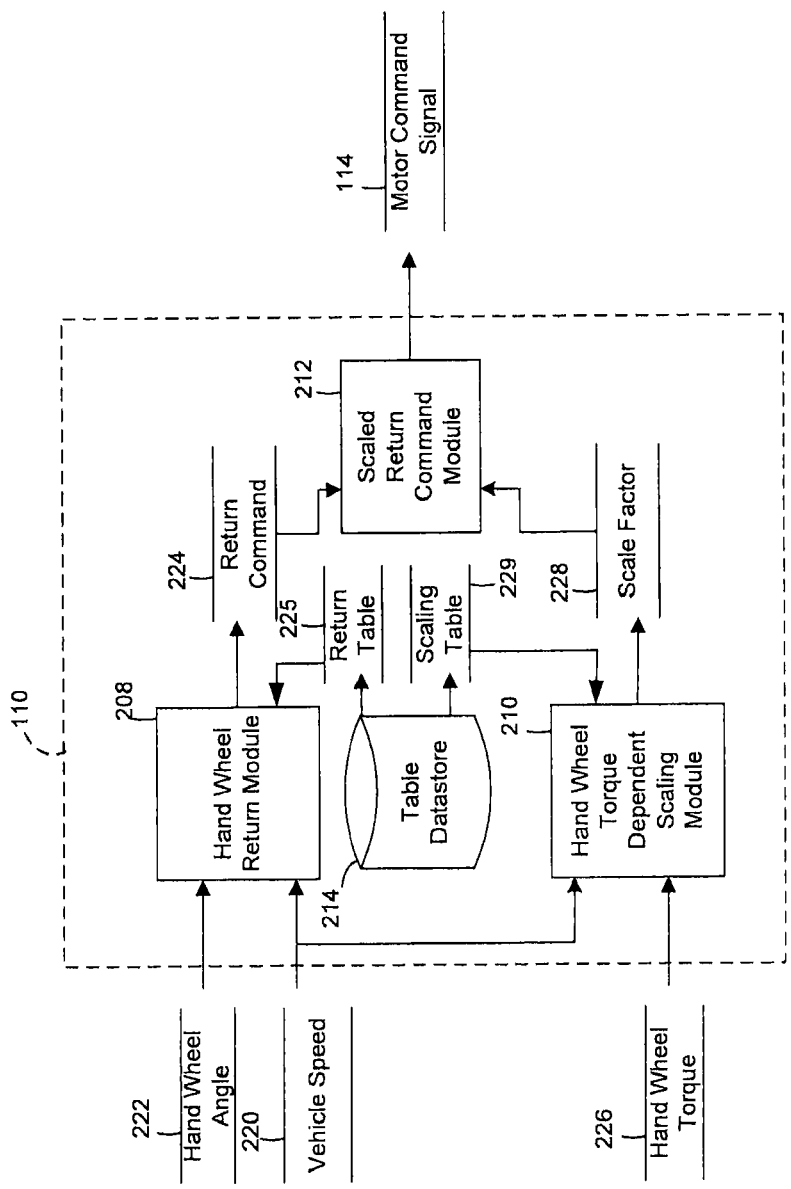
FIG. 2 is a dataflow diagram illustrating an exemplary system for determining return torque.

Referring now to FIG. 2, a dataflow diagram illustrates an exemplary embodiment of the controller 110 of FIG. 1 used to control the steering system 10 of FIG. 1. The controller 110 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

As can be appreciated, the sub-modules shown in FIG. 2 can be combined and/or further partitioned to similarly generate the motor command signal 114. Inputs to the controller 110 can be generated from the sensors 106, 108 (FIG. 1) of the vehicle, can be modeled, and/or can be predefined. In this example, the controller 110 includes a hand wheel return module 208, a hand wheel torque dependent scaling module 210, a scaled return command module 212, and a table datastore 214.

The hand wheel return module 208 receives as input vehicle speed 220 and hand wheel angle 222. The hand wheel angle 222 may be, for example, an angular position of the hand wheel 104 (of FIG. 1) relative to the center position of the hand wheel 104 (of FIG. 1). The hand wheel return module 208 determines a return command 224 based on the vehicle speed 220 and the hand wheel angle 222. In various embodiments, the hand wheel return module 208 determines the return command 224 using one or more hand wheel return lookup tables 225. The lookup tables 225 can be indexed by the vehicle speed 220 and/or the hand wheel angle 222. The lookup tables 225 can be stored in and accessed from the table datastore 214.

In one example, the hand wheel return module 208 is associated with nine return tables 225. A unique vehicle speed 220 is defined for each of the nine return tables. A return curve is defined by the data points in the nine return tables. For example, each of the nine return curves is composed of sixteen data points. The data points are defined by the axis, where the axis is defined by hand wheel angle 222. In one example, the hand wheel angle 222 can range from zero to nine-hundred degrees. In various embodiments, the axis can be selectable. In various embodiments, all return curves share a common axis. As can be appreciated, the data of the return curves can be increasing or decreasing. The speed defined for curve zero can be used as a return speed breakpoint (e.g., return command is ramped to zero below the breakpoint speed).

Figure 3:
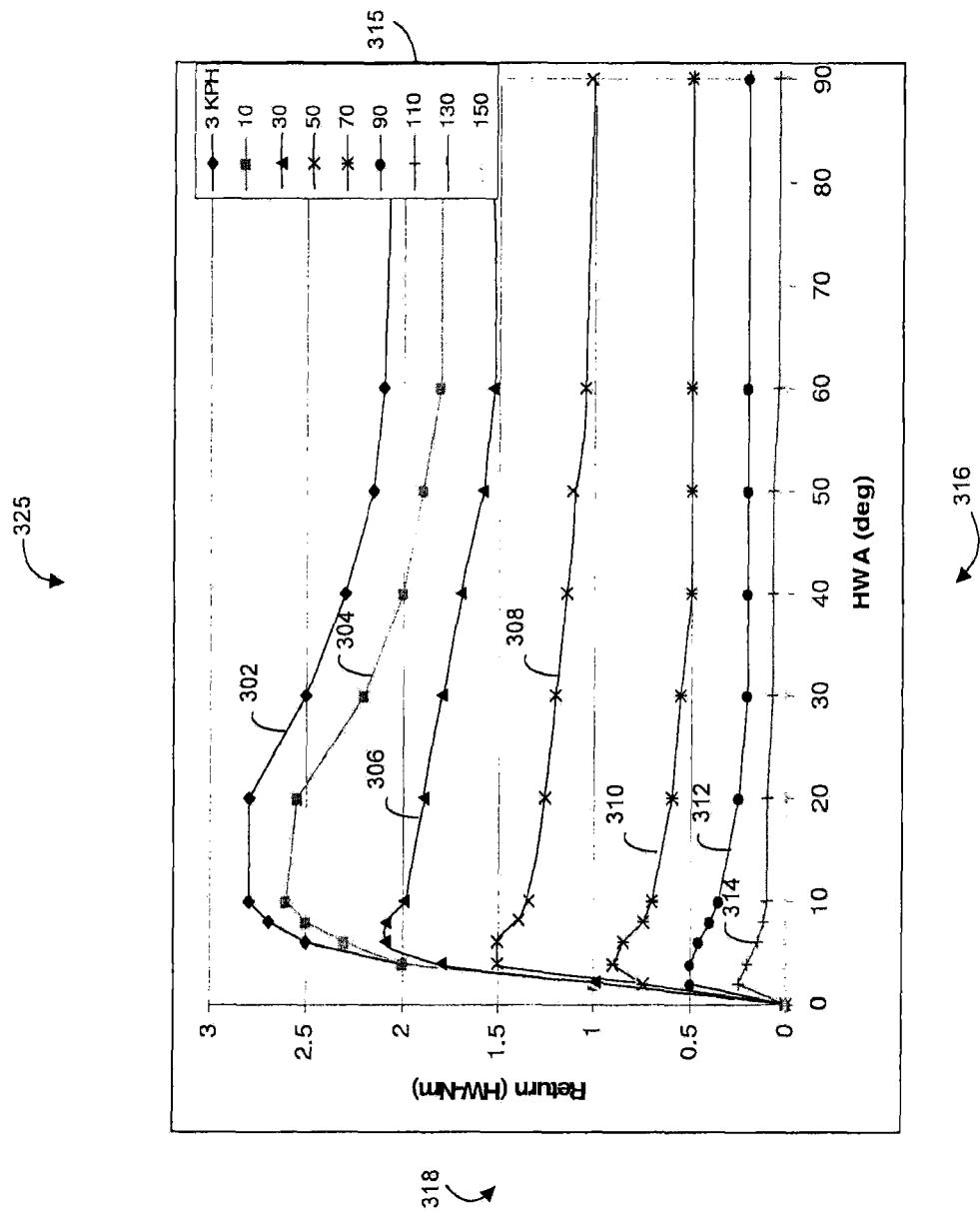
FIG. 3 is a graph illustrating an exemplary embodiment of a table used to determine a return torque.

FIG. 3 illustrates an exemplary embodiment of a return table 325. In this example, the return table 325 includes all nine return curves 302-314 (e.g., is a three-dimensional lookup table). As can be appreciated, the return table 325 can be implemented as nine separate return tables, shown collectively in FIG. 2 as return tables 225, one for each discrete vehicle speed (e.g., nine two-dimensional lookup tables).

In this example, the hand wheel angle 222 is represented on the x-axis 316. The return command 224 is represented on the y-axis 318. The curves 302-314 represent a range of discrete vehicle speeds 220 as shown in the index 315. The return command 224 may be calculated by determining the return command value from the input hand wheel angle 222 and the curve representing the input vehicle speed 220. Interpolation between curves 302-314 is used when the vehicle speed 220 does not equal the discrete vehicle speed 220 of one of the given curves 302-314. For example, return command values are looked up from the two nearest return curves 302-314 and the return command 224 is determined based on an average between the two return command values. As can be appreciated, other methods of interpolation can be used to determine the return command 224.

Referring back to FIG. 2, the hand wheel torque dependent scaling module 210 receives as input hand wheel torque 226 and the vehicle speed 220. The hand wheel torque dependent scaling module 210 generates a scale factor 228 to tune the return command 224 based on the hand wheel torque 226 and the vehicle speed 220. In various embodiments, the hand wheel torque dependent scaling module 210 generates the scale factor 228 using one or more scaling lookup tables 229. The lookup tables 229 can be indexed by the vehicle speed 220 and/or the hand wheel torque 226.

In one example, the hand wheel torque dependent scaling module 210 includes nine scaling tables 229. As with the return tables 225, a unique vehicle speed 220 is defined for each of the nine tables 229. In various embodiments, the unique vehicle speeds 220 are the same as the unique vehicle speeds 220 for the return tables 225. A scaling curve is defined by the data points in the nine tables. For example, each of the nine scaling curves is composed of four data points. The data points are defined by the axis, where the axis is defined by hand wheel torque 226. In one example, the hand wheel torque 226 can range from zero to ten Newtonmeters (Nm). In various embodiments, all scaling curves share a common axis.

Figure 4:
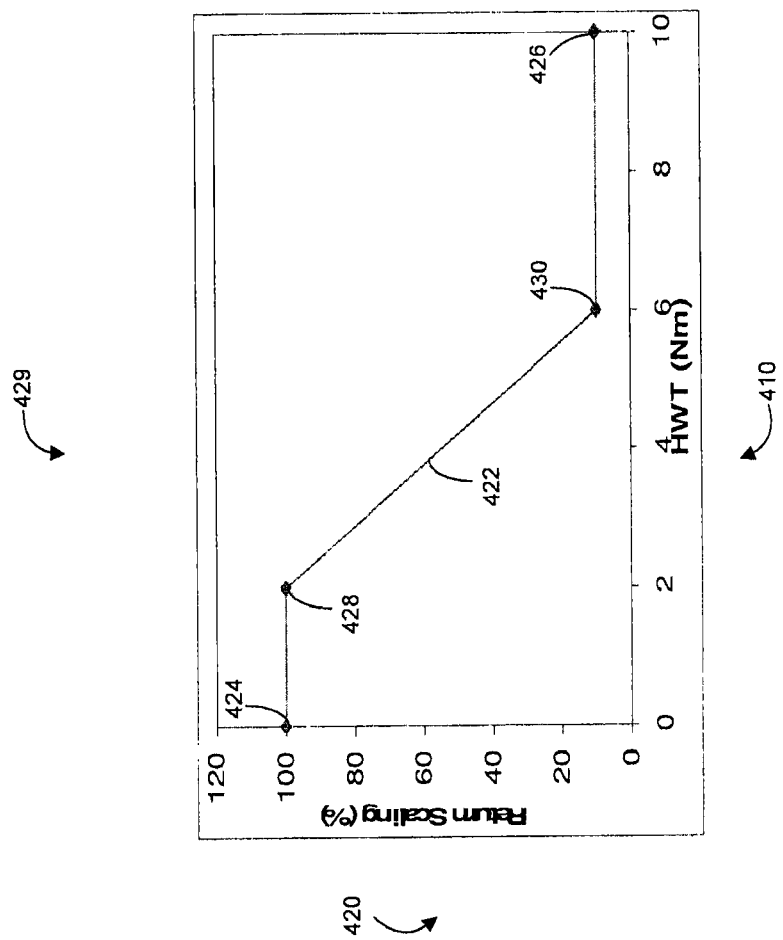
FIG. 4 is a graph illustrating an exemplary embodiment of a table used to determine a scaling for the return torque.

FIG. 4 illustrates an exemplary embodiment of a single scaling table 429, nine of which are shown collectively in FIG. 2 as scaling tables 229. The hand wheel torque 226 is represented on the x-axis 410. The scale factor 228 is represented on the y-axis 420. As can be appreciated, only a single curve 422 representing a single vehicle speed 220 is shown as scaling table 429. In practice, multiple curves (not shown) each representing a different vehicle speed 220, will comprise scaling tables 229 of FIG. 2.

In one example, for each scaling curve, the first point 424 on the curve 422 (zero Nm) can be fixed at one hundred percent return scaling. The last point 426 on the curve 422 (10 Nm), for example, can be fixed at zero percent return scaling. The second point 428, for example, can be defined by the x-coordinate, while the third point 430, for example, can be defined by both the x- and the y-coordinates. The scale factor 228 is calculated by determining the scale value from the input hand wheel torque 226 and the curve 422 representing the input vehicle speed 220. Interpolation between curves 422 can be used when the vehicle speed 220 does not equal the discrete vehicle speed 220 of one of the given curves 422. For example, scaling values are looked up from the two nearest scaling curves and the scale factor 228 is determined based on an average between the two scaling values. As can be appreciated, other methods of interpolation can be used to determine the scale factor 228.

Referring back to FIG. 2, the scaled return command module 212 receives as input the return command 224 and the scale factor 228. The scaled return command module 212 applies the scale factor 228 to the return command 224 and generates the motor command signal 114. In various embodiments, the scaled return command module 212 multiplies the return command 224 by the scale factor 228 to generate the motor command signal 114.

Figure 5:
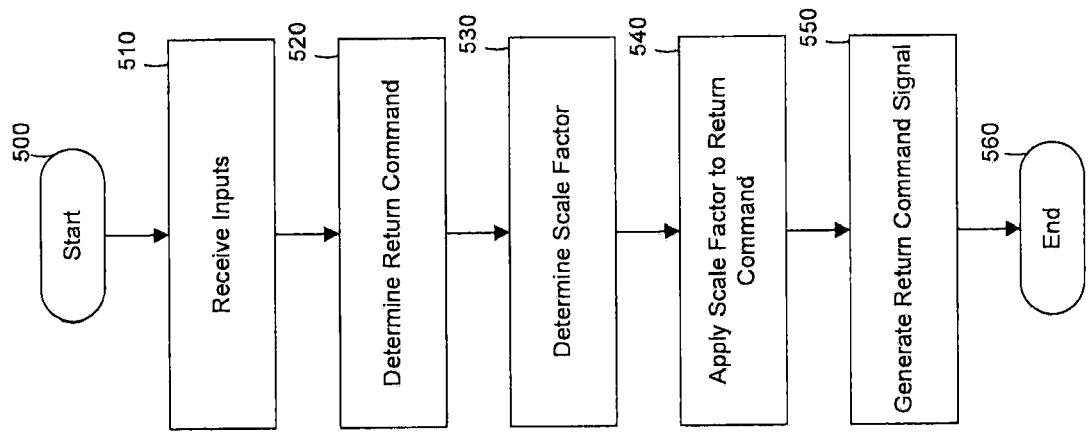
FIG. 5 is a flowchart illustrating an exemplary embodiment of a method for determining return torque.

Referring now to FIG. 5 and with continued reference to FIG. 2, a flowchart illustrates a motor command determination method that can be performed by the controller of FIG. 2. As can be appreciated in light of the disclosure, the order of operation within the method is not limited to the sequential execution as illustrated in FIG. 5, but may be performed in one or more varying orders as applicable and in accordance with the present disclosure.

In one example, the method may begin at 500. The current hand wheel angle 222, the vehicle speed 220, and the hand wheel torque 226 are received at 510. The return command 224 is determined, as discussed above, based on the hand wheel angle 222 and the vehicle speed 220 at 520. The scale factor 228 is determined based on the hand wheel torque 226 and the vehicle speed 220 at 530. The scale factor 228 is applied to the return command 224 at 540 and the motor command signal 114 is generated based thereon at 550. The scaled motor command signal 114 results in an improved tactile feel to the user. Thereafter, the method may end at 560.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the claims not be limited to the particular embodiments disclosed.

The invention claimed is:

1. A method of controlling a motor of a power steering system comprising:
    estimating a return command based on a vehicle speed and a hand wheel angle, the return command to assist a driver in returning vehicle wheels to a center position;
    estimating a scale factor based on the vehicle speed and a hand wheel torque;
    applying the scale factor to the return command by multiplying the scale factor by the return command; and
    generating a motor command signal based on the applying the scale factor to the return command.

2. The method of claim 1, wherein the estimating the return command is based on a lookup table that is indexed by the vehicle speed and the hand wheel angle.

3. The method of claim 1, wherein the estimating the return command is based on a plurality of lookup tables that are indexed by the hand wheel angle, and wherein the plurality of lookup tables are each associated with a discrete vehicle speed.

4. The method of claim 3, wherein the estimating the return command further comprises interpolating the return command based on return commands from two or more of the plurality of lookup tables.

5. The method of claim 1, wherein the estimating the scale factor is based on a lookup table that is indexed by the vehicle speed and the hand wheel torque.

6. The method of claim 1, wherein the estimating the scale factor is based on a plurality of lookup tables that are indexed by the hand wheel torque, and wherein the plurality of lookup tables are each associated with a discrete vehicle speed.

7. The method of claim 6, wherein the estimating the scale factor further comprises interpolating the scale factor based on scale factors from two or more of the plurality of lookup tables.

8. A system for controlling a motor of a power steering system comprising:
   a hand wheel return module that estimates a return command based on a vehicle speed and a hand wheel angle, the return command to assist a driver in returning vehicle wheels to a center position;
   a scaling module that estimates a scale factor based on the vehicle speed and a hand wheel torque; and
   a return command module that applies the scale factor to the return command by multiplying the scale factor by the return command, and that generates a motor command signal based on the applying the scale factor to the return command.

9. The system of claim 8, wherein the hand wheel return module estimates the return command based on a lookup table that is indexed by the vehicle speed and the hand wheel angle.

10. The system of claim 8, wherein the hand wheel return module estimates the return command based on a plurality of lookup tables that are indexed by the hand wheel angle, and wherein the plurality of lookup tables are each associated with a discrete vehicle speed.

11. The system of claim 10, wherein the hand wheel return module estimates the return command by interpolating the return command based on return commands from two or more of the plurality of lookup tables.

12. The system of claim 8, wherein the scaling module estimates the scale factor based on a lookup table that is indexed by the vehicle speed and the hand wheel torque.

13. The system of claim 8, wherein the scaling module estimates the scale factor based on a plurality of lookup tables that are indexed by hand wheel torque, and wherein the plurality of lookup tables are each associated with a discrete vehicle speed.

14. The system of claim 13, wherein the scaling module estimates the scale factor by interpolating the scale factor based on scale factors from two or more of the plurality of lookup tables.

15. A power steering system comprising:
   a hand wheel;
   a motor coupled to the hand wheel; and
   a controller comprising:
      a hand wheel return module that estimates a return command based on a vehicle speed and a hand wheel angle, the return command to assist a driver in returning vehicle wheels to a center position;
      a scaling module that estimates a scale factor based on the vehicle speed and a hand wheel torque; and
      a return command module that applies the scale factor to the return command by multiplying the scale factor by the return command, and that generates a motor command signal based on the applying the scale factor to the return command.

16. The system of claim 15, wherein the controller determines the scale factor based on one or more lookup tables that are indexed by at least one of the vehicle speed and the torque of the hand wheel.

17. The system of claim 16, wherein the scaling module estimates the scale factor by interpolating the scale factor based on scale factors from the one or more lookup tables.

18. The system of claim 15, wherein the hand wheel return module estimates the return command based on a lookup table that is indexed by the vehicle speed and the hand wheel angle.

19. The system of claim 15, wherein the hand wheel return module estimates the return command based on a plurality of lookup tables that are indexed by the hand wheel angle, and wherein the plurality of lookup tables are each associated with a discrete vehicle speed.

20. The system of claim 19, wherein the hand wheel return module estimates the return command by interpolating the return command based on return commands from two or more of the plurality of lookup tables.

* * * * *